United States Patent
Zewail et al.

(10) Patent No.: US 12,063,656 B2
(45) Date of Patent: Aug. 13, 2024

(54) URLLC INDICATIONS WITH MULTI-TRANSMISSION GRANTS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 17/224,038

(22) Filed: Apr. 6, 2021

(65) Prior Publication Data
US 2022/0322408 A1    Oct. 6, 2022

(51) Int. Cl.
*H04W 72/23* (2023.01)
*H04W 52/10* (2009.01)
*H04W 72/1268* (2023.01)
*H04W 72/1273* (2023.01)

(52) U.S. Cl.
CPC .......... *H04W 72/23* (2023.01); *H04W 52/10* (2013.01); *H04W 72/1268* (2013.01); *H04W 72/1273* (2013.01)

(58) Field of Classification Search
None
See application file for complete search history.

(56) References Cited

U.S. PATENT DOCUMENTS

| | | | | |
|---|---|---|---|---|
| 11,290,992 | B2 * | 3/2022 | He | H04W 72/1242 |
| 11,395,303 | B2 * | 7/2022 | Yi | H04L 5/0092 |
| 2018/0302918 | A1 * | 10/2018 | Shaheen | H04W 76/27 |
| 2018/0317123 | A1 * | 11/2018 | Chen | H04W 72/0413 |
| 2019/0349897 | A1 * | 11/2019 | Hosseini | H04L 5/0053 |
| 2020/0077470 | A1 * | 3/2020 | Xiong | H04W 88/06 |
| 2020/0205085 | A1 * | 6/2020 | Li | H04W 52/242 |
| 2020/0267667 | A1 * | 8/2020 | MolavianJazi | H04W 52/365 |
| 2020/0351892 | A1 * | 11/2020 | Yi | H04W 72/042 |
| 2021/0006318 | A1 * | 1/2021 | Kim | H04L 1/1867 |

(Continued)

FOREIGN PATENT DOCUMENTS

WO  WO-2022180618 A1 *  9/2022
WO  WO-2022212725 A1 * 10/2022

*Primary Examiner* — Kodzovi Acolatse
(74) *Attorney, Agent, or Firm* — Patterson & Sheridan, L.L.P/Qualcomm incorporated

(57) ABSTRACT

Certain aspects of the present disclosure provide techniques for ultra-reliable low latency communications (URLLC) indications with multi-physical downlink shared channel (PDSCH) and/or multi-physical uplink shared channel (PUSCH) grants. A method that may be performed by a user equipment (UE) includes receiving, from a network entity, downlink control information (DCI) scheduling a plurality of transmissions of a first priority, wherein the DCI comprises at least one field indicating one or more parameters to apply when at least one previously scheduled transmission of a second priority collides with: one or more of the plurality of transmissions of the first priority, or one or more transmissions acknowledging the one or more of the plurality of transmissions of the first priority; and applying the one or more parameters to process the plurality of the transmissions of the first priority.

7 Claims, 10 Drawing Sheets

(56) References Cited

U.S. PATENT DOCUMENTS

| | | | | |
|---|---|---|---|---|
| 2021/0068195 | A1* | 3/2021 | Yang | H04W 72/56 |
| 2021/0144708 | A1* | 5/2021 | Wang | H04W 72/0453 |
| 2021/0167912 | A1* | 6/2021 | Yamamoto | H04L 5/0048 |
| 2021/0204220 | A1* | 7/2021 | Zhang | H04W 76/11 |
| 2021/0282123 | A1* | 9/2021 | Wong | H04L 1/08 |
| 2021/0329663 | A1* | 10/2021 | Wong | H04W 72/1289 |
| 2021/0337569 | A1* | 10/2021 | Fu | H04W 72/569 |
| 2021/0385826 | A1* | 12/2021 | Moon | H04L 1/00 |
| 2022/0039029 | A1* | 2/2022 | Zhang | H04W 52/34 |
| 2022/0046671 | A1* | 2/2022 | Yang | H04W 72/1268 |
| 2022/0078823 | A1* | 3/2022 | Li | H04W 72/1268 |
| 2022/0132537 | A1* | 4/2022 | Wang | H04L 5/0094 |
| 2022/0167383 | A1* | 5/2022 | Aiba | H04W 72/1242 |
| 2022/0201697 | A1* | 6/2022 | Yamamoto | H04W 72/042 |
| 2022/0225380 | A1* | 7/2022 | Zhang | H04W 72/1247 |
| 2022/0295473 | A1* | 9/2022 | Yin | H04L 1/1812 |
| 2022/0312337 | A1* | 9/2022 | Lim | H04W 52/54 |
| 2022/0322408 | A1* | 10/2022 | Zewail | H04W 72/569 |
| 2023/0361957 | A1* | 11/2023 | Abdelghaffar | H04L 5/0078 |

* cited by examiner

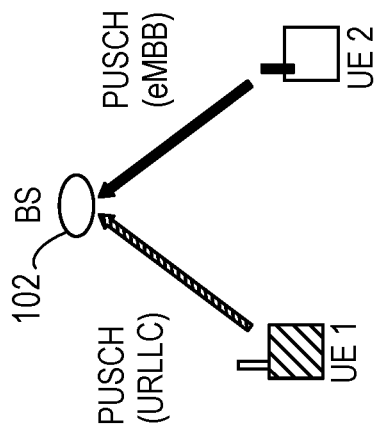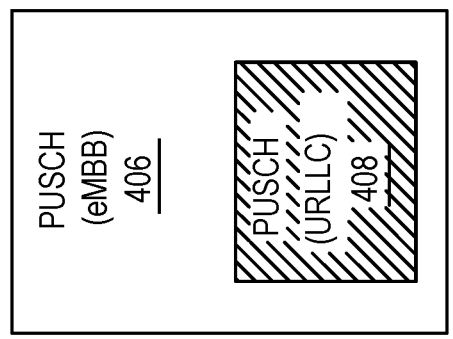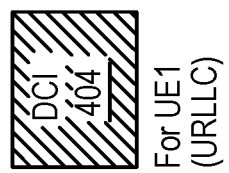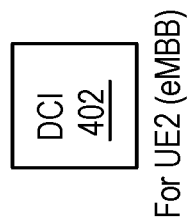
FIG. 4

US 12,063,656 B2

URLLC INDICATIONS WITH MULTI-TRANSMISSION GRANTS

INTRODUCTION

Aspects of the present disclosure relate to wireless communications, and more particularly, to techniques for ultra-reliable low latency communications (URLLC) indications with multi-physical downlink shared channel (PDSCH) and/or multi-physical uplink shared channel (PUSCH) grants.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division, orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a UE. The method generally includes receiving, from a network entity, downlink control information (DCI) scheduling a plurality of transmissions of a first priority, wherein the DCI comprises at least one field indicating one or more parameters to apply when at least one previously scheduled transmission of a second priority collides with: one or more of the plurality of transmissions of the first priority, or one or more transmissions acknowledging the one or more of the plurality of transmissions of the first priority; and applying the one or more parameters to process the plurality of the transmissions of the first priority.

Certain aspects can be implemented in a processing system for wireless communication by a UE. The processing system generally includes a memory comprising computer-executable instructions and one or more processors configured to execute the computer-executable instructions and cause the processing system to: receive, from a network entity, DCI scheduling a plurality of transmissions of a first priority, wherein the DCI comprises at least one field indicating one or more parameters to apply when at least one previously scheduled transmission of a second priority collides with: one or more of the plurality of transmissions of the first priority, or one or more transmissions acknowledging the one or more of the plurality of transmissions of the first priority; and apply the one or more parameters to process the plurality of the transmissions of the first priority.

Certain aspects can be implemented in an apparatus for wireless communication by a UE. The apparatus may include means for receiving, from a network entity, DCI scheduling a plurality of transmissions of a first priority, wherein the DCI comprises at least one field indicating one or more parameters to apply when at least one previously scheduled transmission of a second priority collides with: one or more of the plurality of transmissions of the first priority, or one or more transmissions acknowledging the one or more of the plurality of transmissions of the first priority; and means for applying the one or more parameters to process the plurality of the transmissions of the first priority.

Certain aspects can be implemented in a non-transitory computer-readable medium for wireless communication by a UE. The non-transitory computer-readable medium may comprise computer-executable instructions that, when executed by one or more processors of a processing system, cause the processing system to: receive, from a network entity, DCI scheduling a plurality of transmissions of a first priority, wherein the DCI comprises at least one field indicating one or more parameters to apply when at least one previously scheduled transmission of a second priority collides with: one or more of the plurality of transmissions of the first priority, or one or more transmissions acknowledging the one or more of the plurality of transmissions of the first priority; and apply the one or more parameters to process the plurality of the transmissions of the first priority.

Certain aspects can be implemented in a computer program product for wireless communication by a UE embodied on a computer-readable storage medium. The computer-readable storage medium may comprise code for receiving, from a network entity, DCI scheduling a plurality of transmissions of a first priority, wherein the DCI comprises at least one field indicating one or more parameters to apply when at least one previously scheduled transmission of a second priority collides with: one or more of the plurality of transmissions of the first priority, or one or more transmissions acknowledging the one or more of the plurality of transmissions of the first priority; and applying the one or more parameters to process the plurality of the transmissions of the first priority.

Certain aspects can be implemented in a method for wireless communication performed by a network entity. The method generally includes determining one or more parameters for a UE to apply to process a plurality of transmissions of a first priority when at least one previously scheduled transmission of a second priority collides with: one or more of the plurality of transmissions of the first priority, or one or more transmissions acknowledging the one or more of the plurality of transmissions of the first priority; and transmitting, to the UE, DCI scheduling the plurality of transmissions, wherein the DCI comprises at least one field indicating the one or more parameters.

Certain aspects can be implemented in a processing system for wireless communication by a network entity. The processing system generally includes a memory comprising computer-executable instructions and one or more processors configured to execute the computer-executable instructions and cause the processing system to: determine one or more parameters for a UE to apply to process a plurality of transmissions of a first priority when at least one previously scheduled transmission of a second priority collides with: one or more of the plurality of transmissions of the first priority, or one or more transmissions acknowledging the one or more of the plurality of transmissions of the first priority; and transmit, to the UE, DCI scheduling the plurality of transmissions, wherein the DCI comprises at least one field indicating the one or more parameters.

Certain aspects can be implemented in an apparatus for wireless communication by a network entity. The apparatus may include means for determining one or more parameters for a UE to apply to process a plurality of transmissions of a first priority when at least one previously scheduled transmission of a second priority collides with: one or more of the plurality of transmissions of the first priority, or one or more transmissions acknowledging the one or more of the plurality of transmissions of the first priority; and means for transmitting, to the UE, DCI scheduling the plurality of transmissions, wherein the DCI comprises at least one field indicating the one or more parameters.

Certain aspects can be implemented in a non-transitory computer-readable medium for wireless communication by a network entity. The non-transitory computer-readable medium may comprise computer-executable instructions that, when executed by one or more processors of a processing system, cause the processing system to: determine one or more parameters for a UE to apply to process a plurality of transmissions of a first priority when at least one previously scheduled transmission of a second priority collides with: one or more of the plurality of transmissions of the first priority, or one or more transmissions acknowledging the one or more of the plurality of transmissions of the first priority; and transmit, to the UE, DCI scheduling the plurality of transmissions, wherein the DCI comprises at least one field indicating the one or more parameters.

Certain aspects can be implemented in a computer program product for wireless communication by a network entity embodied on a computer-readable storage medium. The computer-readable storage medium may comprise code for: determining one or more parameters for a UE to apply to process a plurality of transmissions of a first priority when at least one previously scheduled transmission of a second priority collides with: one or more of the plurality of transmissions of the first priority, or one or more transmissions acknowledging the one or more of the plurality of transmissions of the first priority; and transmitting, to the UE, DCI scheduling the plurality of transmissions, wherein the DCI comprises at least one field indicating the one or more parameters.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 4 depicts scheduling of enhanced mobile broadband (eMBB) and ultra-reliable low latency communications (URLLC) transmissions that collide.

DETAILED DESCRIPTION

Aspects of the present disclosure provide apparatuses, methods, processing systems, and computer-readable mediums for indicating how to prioritize transmissions for different types of service when those transmissions are scheduled on overlapping resources.

For example, New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Techniques described herein may allow signaling of parameters to be applied in scenarios where a single DCI schedules multiple URLLC transmissions on resources that overlap with resources of previously-scheduled eMBB transmissions. For example, the techniques presented herein may allow a UE to determine how or whether to apply a priority indicator (PI) field and/or open loop power control (OLPC) parameters to a URLLC PUSCH transmission that overlaps with an eMBB PUSCH transmission.

Introduction to Wireless Communication Networks

Figure 1:
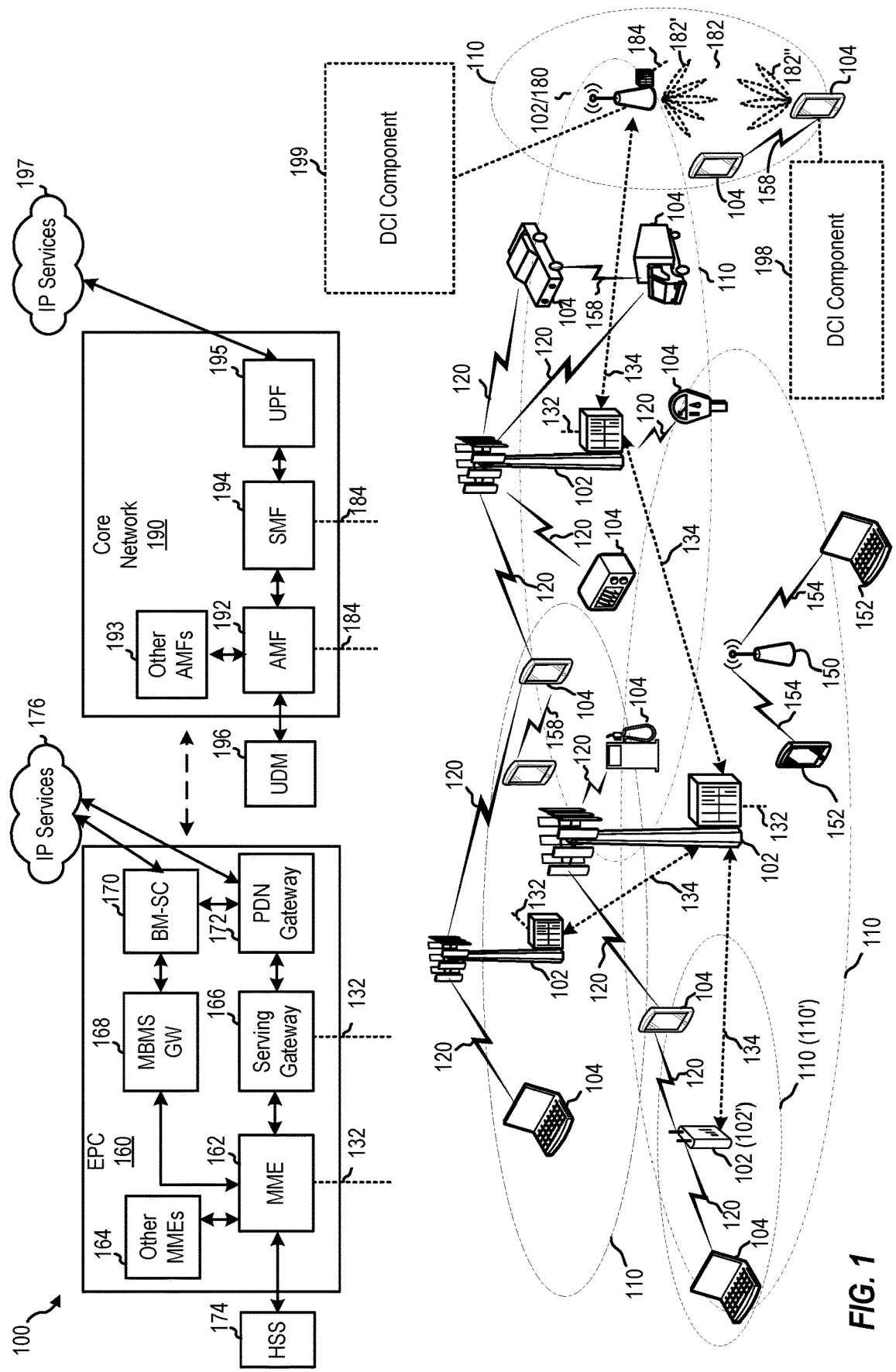
FIG. 1 is a block diagram conceptually illustrating an example wireless communication network.

FIG. 1 depicts an example of a wireless communications system 100, in which aspects described herein may be implemented.

Figure 5:
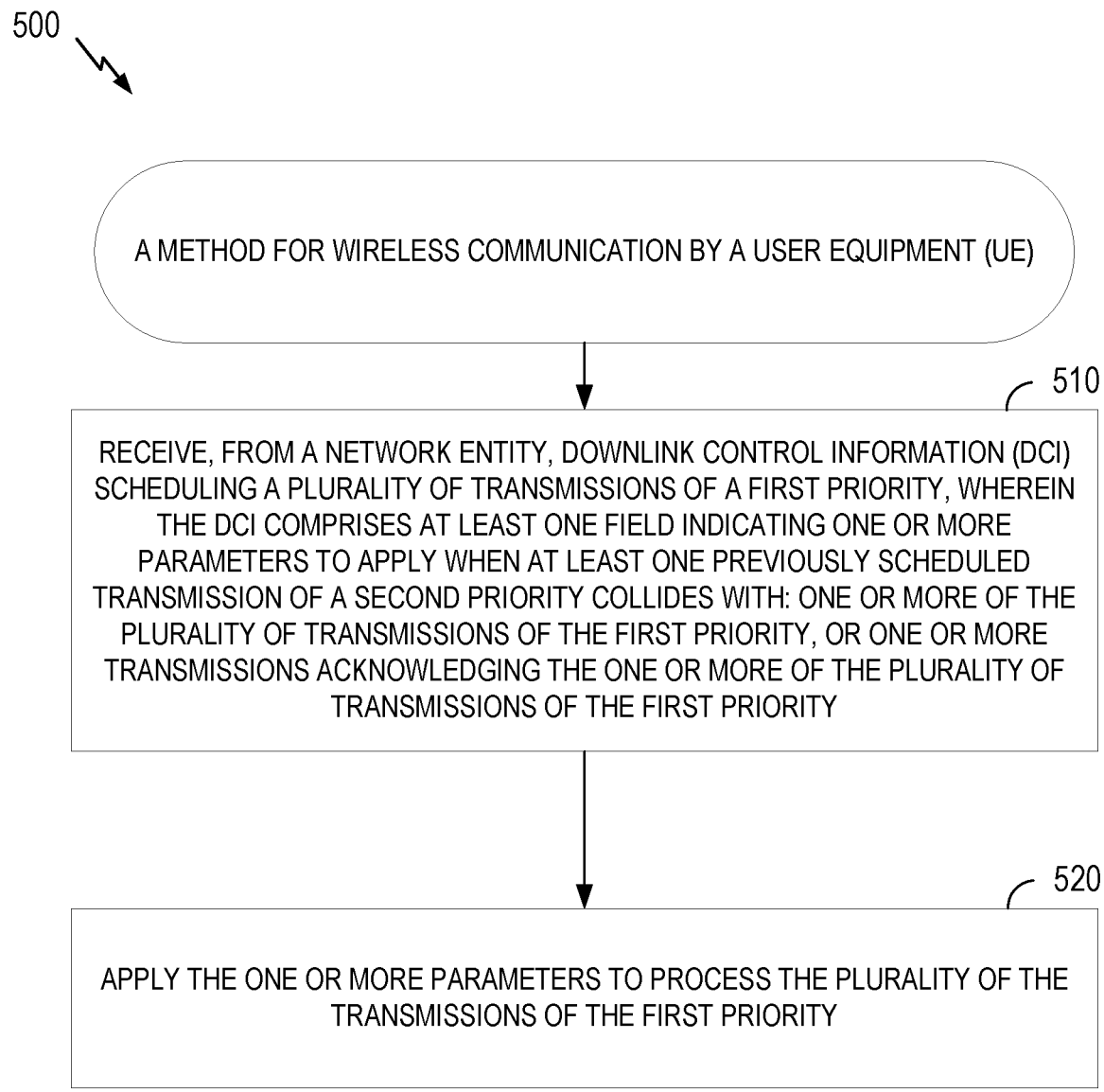
FIG. 5 is a flow diagram illustrating example operations for wireless communication by a base station.
Figure 6:
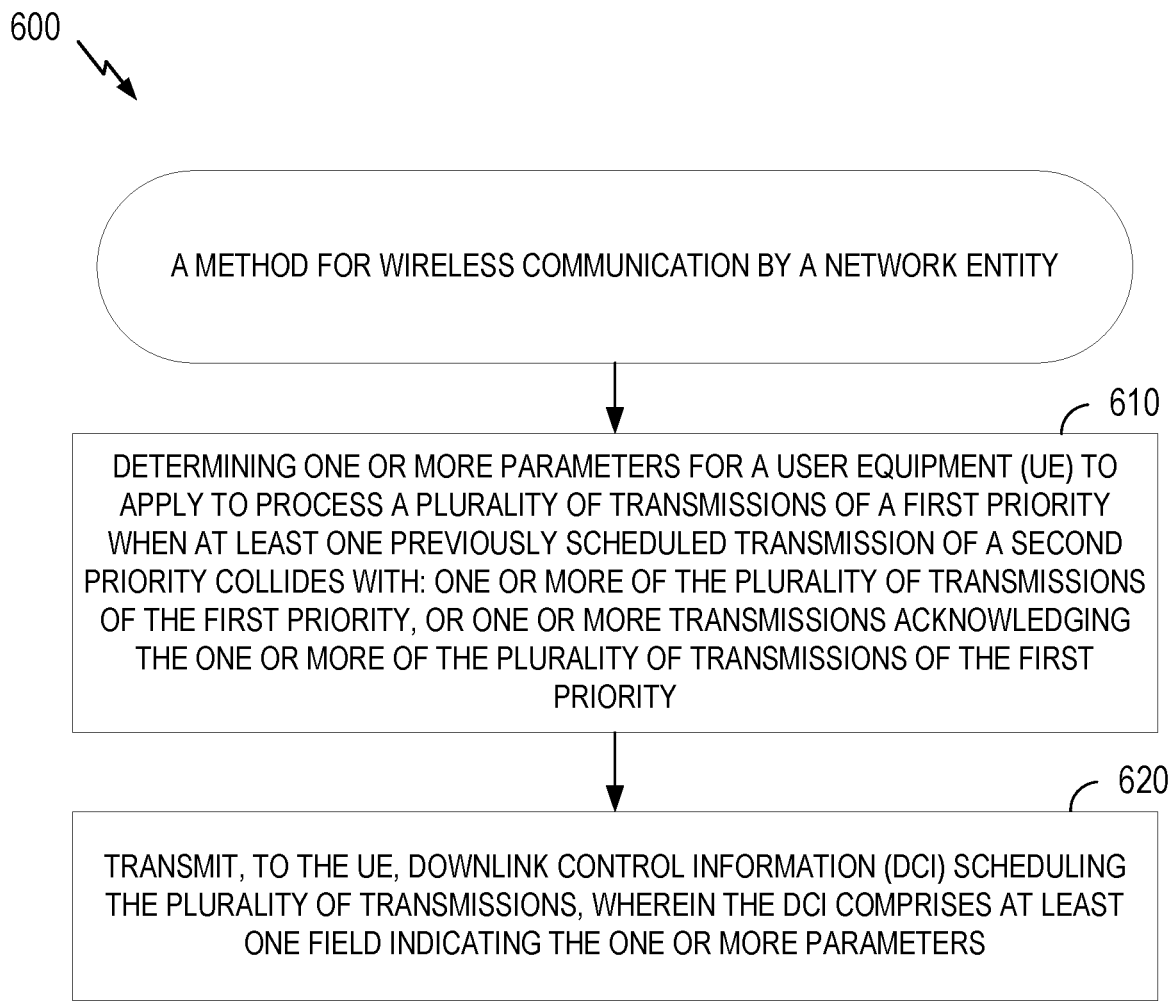
FIG. 6 is a flow diagram illustrating example operations for wireless communication by a user equipment.

For example, the wireless communication system 100 may include a base station (BS) 102 that includes a downlink control information (DCI) component 199, which may be configured to perform one or more of the operations illustrated in FIG. 6, as well as other operations described herein for indicating priority for multi-physical downlink shared channel (PDSCH) and/or multi-physical uplink shared channel (PUSCH) grants. Additionally, as shown, the UE 104 may include DCI component 198, which may be used configured to perform one or more of the operations illustrated in FIG. 5, as well as other operations described herein for processing multi-physical downlink shared channel (PDSCH) and/or multi-physical uplink shared channel (PUSCH) based on indicated parameters.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 2:
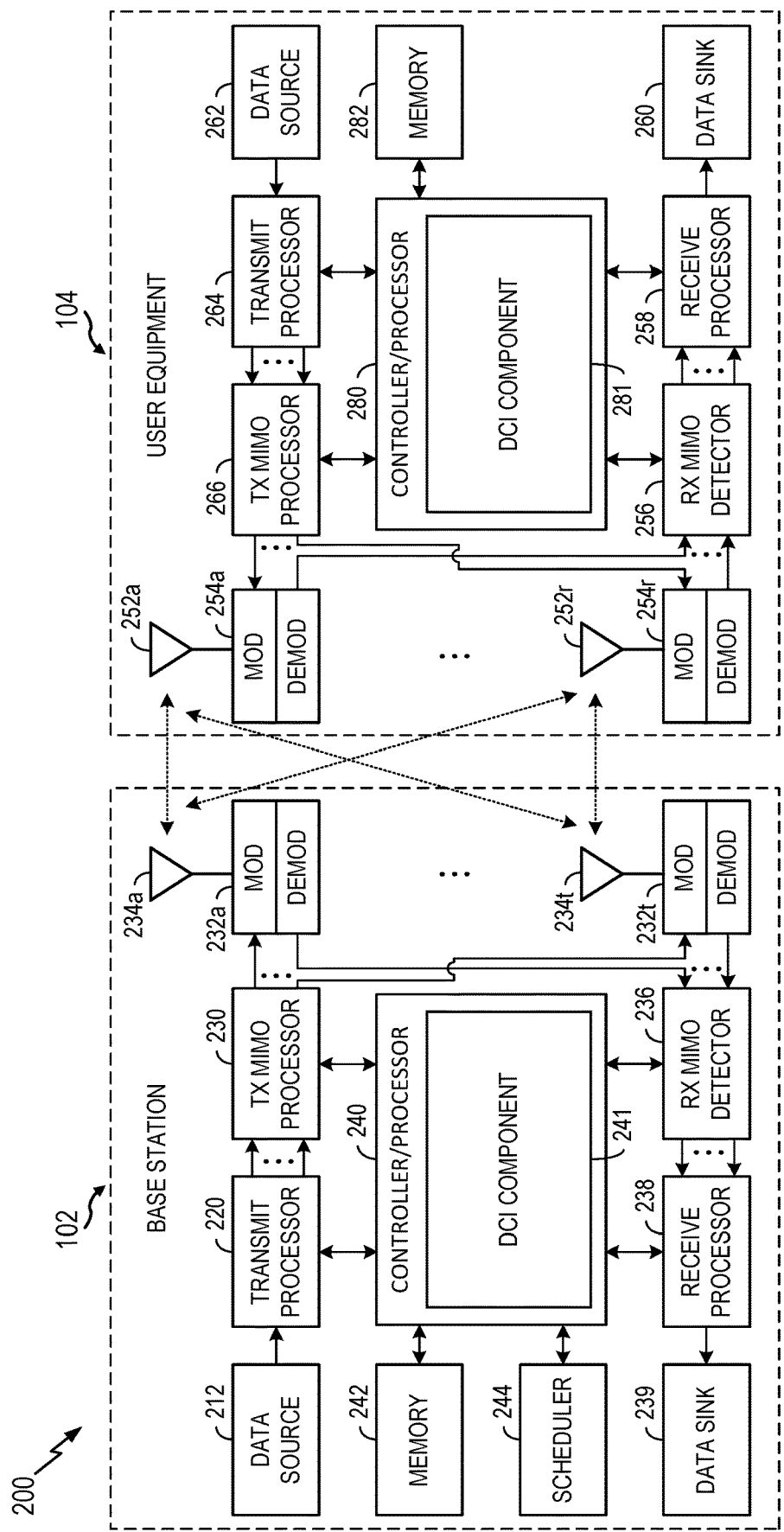
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes DCI component 241, which may be representative of DCI component 199 of FIG. 1. Notably, while depicted as an aspect of controller/processor 240, DCI component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., source data 262) and wireless reception of data (e.g., data sink 260).

User equipment 104 includes controller/processor 280, which may be configured to implement various functions related to wireless communications. In the depicted example, controller/processor 280 includes DCI component 281, which may be representative of DCI component 198 of FIG. 1. Notably, while depicted as an aspect of controller/processor 280, DCI component 281 may be implemented additionally or alternatively in various other aspects of user equipment 104 in other implementations.

Figure 3:
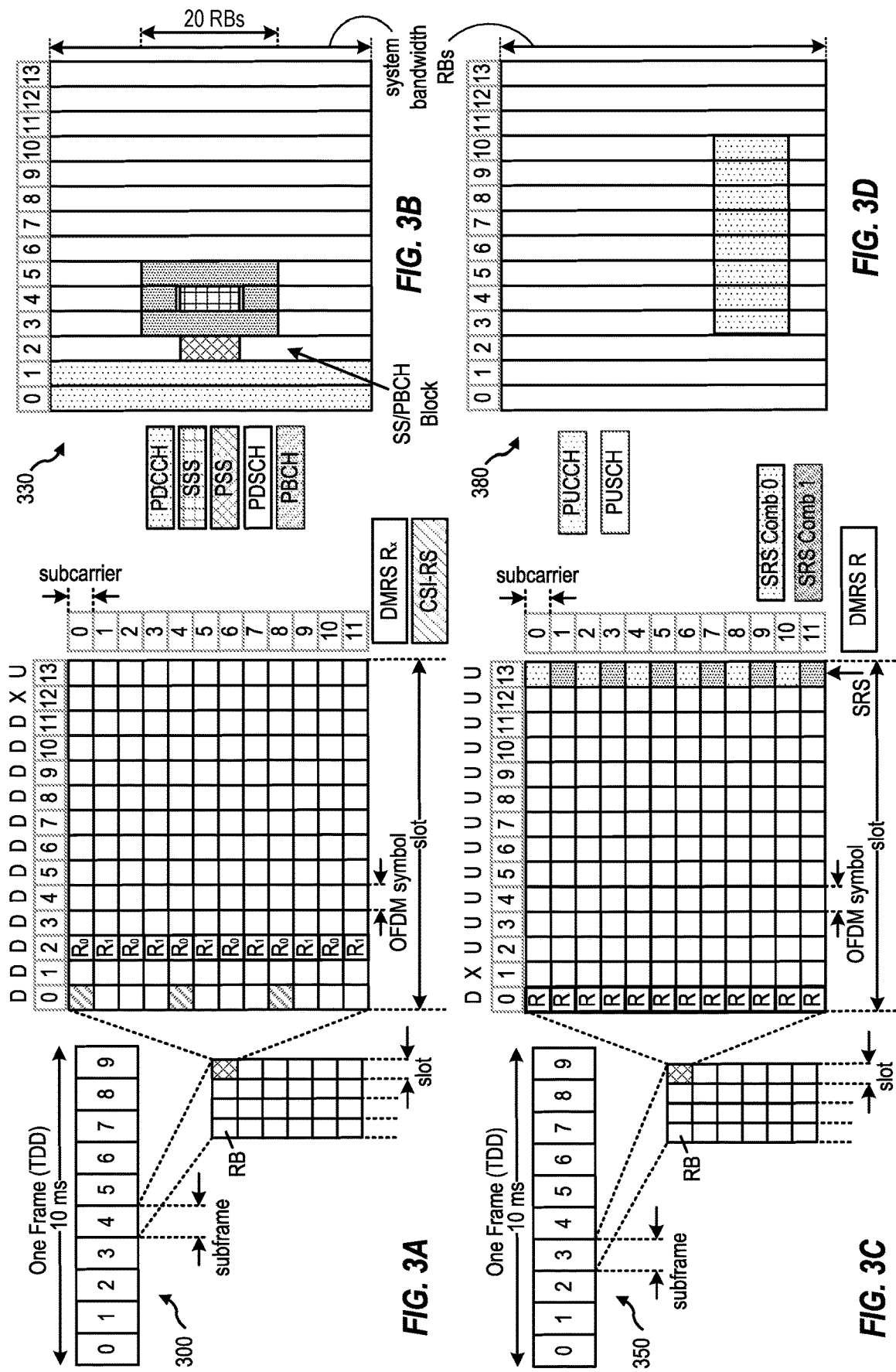
FIGS. 3A-3D depict various example aspects of data structures for a wireless communication network.

FIGS. 3A-3D depict aspects of data structures for a wireless communication network, such as wireless communication system 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Uplink Power Control Considerations

Power control generally refers to a mechanism for varying transmit power in accordance with varying channel conditions (e.g., to achieve a desired data rate). As the battery of a UE is typically power limited compared to base station power, uplink power control is an important mechanism to limit intra-cell and inter-cell interference and to reduce UE power consumption.

Uplink power control is generally a combination of open loop power control (OLPC) and closed loop power control (CLPC) mechanisms. OLPC generally refers to the ability of a UE transmitter to sets its output power to a specific value to compensate for increases in path loss (PL). CLPC is based on feedback from a base station (BS) to the UE, in the form of a transmit power control command (TPC). Based on the TPC, a UE will either increase or decrease its power as instructed.

For a physical uplink shared channel (PUSCH) transmission, an open loop power control equation (for a given subframe i) may be defined as:

$$P_{OPEN\_LOOP\_PUSCH} = \min\{Pcmax, 10 \times LOG(M_{PUSCH}(i)) + P_{O\_PUSCH}(i) + [PL = \alpha(i)] + \Delta_{TF}(i)\}$$

where Pcmax is a specified UE maximum transmit power, P0 is a target received power, PL is the downlink path loss calculated by the UE as a combination of reference signal received power (RSRP) measurements and knowledge of the reference signal transmit power, and a is a factor used to configure the use of fractional power control.

$\Delta_{TF}(i)$ relates to the modulation and coding scheme (MCS) and generally serves to increase the UE transmit power when transferring a large number of bits per Resource Element. This links the UE transmit power to the Modulation and Coding Scheme (MCS). The number of bits per Resource Element is high when using 64 quadrature amplitude modulation (QAM) and a large transport block size. The number of bits per Resource Element is low when using quadrature phase shift keying (QPSK) and a small transport block size. Increasing the UE transmit power helps to achieve the signal-to-interference-plus-noise ratio (SINR) requirements associated with higher order modulation schemes and high coding rates.

In some cases, certain UL OLPC parameters, such as P0 and α may be signaled dynamically, via DCI. In some cases, different combinations of values for P0 and α may be configured (e.g., via RRC signaling) and a particular combination may be signaled via a DCI OLPC field. Aspects of the present disclosure may allow a UE to determine how to apply such OLPC parameters, when signaled in a single DCI scheduling multiple transmissions.

The Aspects of the present disclosure provide apparatuses, methods, processing systems, and computer-readable mediums for indicating how to prioritize transmissions for different types of service when those transmissions are scheduled on overlapping resources. For example, the techniques described herein may allow a UE to determine how or whether to apply a DCI signaled priority indicator (PI) field and/or open loop power control (OLPC) parameters to a URLLC PUSCH transmission that overlaps with an eMBB PUSCH transmission. Such parameters may be signaled, for example, in single DCI conveyed grant that schedules multiple URLLC physical uplink shared channel (PUSCH) or physical downlink shared channel (PDSCH) transmissions.

Priority Indicator Considerations

In certain wireless communication systems (e.g., 5G NR systems), a user equipment (UE) may indicate priorities for transmission power reductions when two or more uplink carriers are scheduled to transmit at the same transmission occasion. For example, the priorities may dictate transmit power reductions to certain channels in order to ensure total transmit power does not exceed a UE maximum transmit power (e.g., PCMAX).

In some cases, a transmission may be associated with a priority index, such as an ordinal number (e.g., 0, 1, 2, 3, etc., where a higher number represents a higher priority). In NR, a priority index may have a value of 0 or 1. For example, downlink control information (DCI) that schedules an uplink transmission may include a priority indicator (PI) field that signals a priority index associated with the transmission. The priority index may be used to determine the prioritization as described herein.

As an example, a PUCCH/PUSCH transmission with higher priority index (e.g., a priority index of 1 for URLLC service type) may take priority over another PUCCH/PUSCH transmission with a lower priority index (e.g., a priority index of 0 for eMBB).

In some cases, a UE may decide not to transmit (e.g., to cancel) a lower priority transmission (as indicated by a PI field in a scheduling DCI) if that lower priority transmission overlaps with a higher priority transmission. This may occur, for example, if higher priority traffic arrives after the lower priority transmission is already scheduled. As another example, this may occur if a ultra-reliable low latency communication (URLLC) physical uplink shared channel (PUSCH), or if a physical uplink control channel (PUCCH) carrying acknowledgment feedback for a URLLC physical downlink shared channel (PDSCH), overlaps with an enhanced mobile broadband (eMBB) uplink transmission.

Aspects of the present disclosure may allow a UE to determine how to apply a value indicated in a PI field, when signaled in a DCI scheduling multiple transmissions.

Aspects Related to URLLC Indications with
Multi-PDSCH and/or Multi PUSCH Grants

Aspects of the present disclosure provide apparatuses, methods, processing systems, and computer-readable mediums for indicating how to prioritize transmissions for different types of service when those transmissions are scheduled on overlapping resources. For example, the techniques described herein may allow a user equipment (UE) to determine how or whether to apply a downlink control information (DCI)-signaled priority indicator (PI) field and/or open loop power control (OLPC) parameters to a ultra-reliable low latency communication (URLLC) physical uplink shared channel (PUSCH) transmission that overlaps with an enhanced mobile broadband (eMBB) PUSCH transmission. Such parameters may be signaled, for example, in single DCI conveyed grant that schedules multiple URLLC PUSCH or physical downlink shared channel (PDSCH) transmissions.

FIG. 4 illustrates an example of how such resources may overlap. FIG. 4 depicts scheduling of eMBB and URLLC transmissions that collide. As used herein, transmissions are considered as colliding if they are scheduled on fully or partially overlapping time and frequency resources (e.g., part or all of a resource block). In the illustrated example, a BS sends a first DCI 402 to schedule an eMBB PUSCH transmission 406 from a first UE, UE2 (e.g., with the DCI PI indicating low priority). Subsequently, urgent URLLC traffic (high priority) arrives for a second UE, UE1, and the BS schedules a URLLC PUSCH transmission 408 from UE1 (e.g., with the DCI PI indicating high priority). As illustrated, the resources for URLLC PUSCH transmission 408 overlap with resources for eMBB PUSCH transmission 406.

In this scenario, since assigning different resources may not be possible, the second DCI 404 that schedules UE1 can include one or more parameters designed to increase the likelihood BS 102 can successfully receive the URLLC PUSCH 408. For example, the second DCI may include an indication (e.g., via an OLPC field) that results in increased transmit power, which may allow BS 102 to successfully receive the URLLC PUSCH 408. For example, DCI 404 may include an OLPC field value that indicates UE1 is to modify P0 to boost the power when transmitting URLLC PUSCH 408.

Example Operations for URLLC Indications with Multi-PDSCH and/or Multi-PUSCH Grants One challenge presented in systems that allow a single DCI to schedule multiple transmissions, is how the UE is to interpret and apply parameters indicated in the DCI, such as the PI and OLPC parameters described above.

For example, if the DCI schedules multiple URLLC PUSCH transmissions, the UE may need to know to which of these PUSCH transmissions it should apply the indicated parameters. In the case that one or more of the URLLC PUSCH transmissions collide with a previously-scheduled eMBB transmission, the UE may need to decide whether to apply the indicator (PI and/or OLPC) parameters to all transmissions or only certain transmissions (e.g., colliding transmissions).

FIG. 5 is a flow diagram illustrating example operations 500 for wireless communication, in accordance with certain aspects of the present disclosure. The operations 500 may be performed, for example, by a UE (e.g., such as the UE 104 in the wireless communication system 100 of FIG. 1) for communicating based on URLLC indications with multi-PDSCH and/or multi-PUSCH grants. The operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the DCI component 281) obtaining and/or outputting signals.

The operations 500 begin at 510 by receiving, from a network entity, DCI scheduling a plurality of transmissions (e.g., URLLC transmissions) of a first priority, wherein the DCI comprises at least one field indicating one or more parameters to apply when at least one previously scheduled transmission (e.g., eMBB transmission(s)) of a second priority collides with: one or more of the plurality of transmissions of the first priority, or one or more transmissions acknowledging the one or more of the plurality of transmissions of the first priority.

At 520, the UE applies the one or more parameters to process the plurality of the transmissions of the first priority.

FIG. 6 is a flow diagram illustrating example operations 600 for wireless communication that may be considered complementary to operations 500 of FIG. 5. For example, the operations 600 may be performed by a BS (e.g., such as the BS 102 in the wireless communication system 100 of FIG. 1) to schedule a UE (performing operations 500 of FIG. 5) with multi-PDSCH and/or multi-PUSCH grants. The operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240, including the DCI component 241) obtaining and/or outputting signals.

Operations 600 begin, in block 610, with determining one or more parameters for a UE to apply to process a plurality of transmissions (e.g., URLLC transmissions) of a first priority when at least one previously scheduled transmission (e.g., eMBB transmission(s)) of a second priority collides with: one or more of the plurality of transmissions of the first priority, or one or more transmissions acknowledging the one or more of the plurality of transmissions of the first priority.

At 620, the BS transmits, to the UE, DCI scheduling the plurality of transmissions, wherein the DCI comprises at least one field indicating the one or more parameters.

Figure 7A:
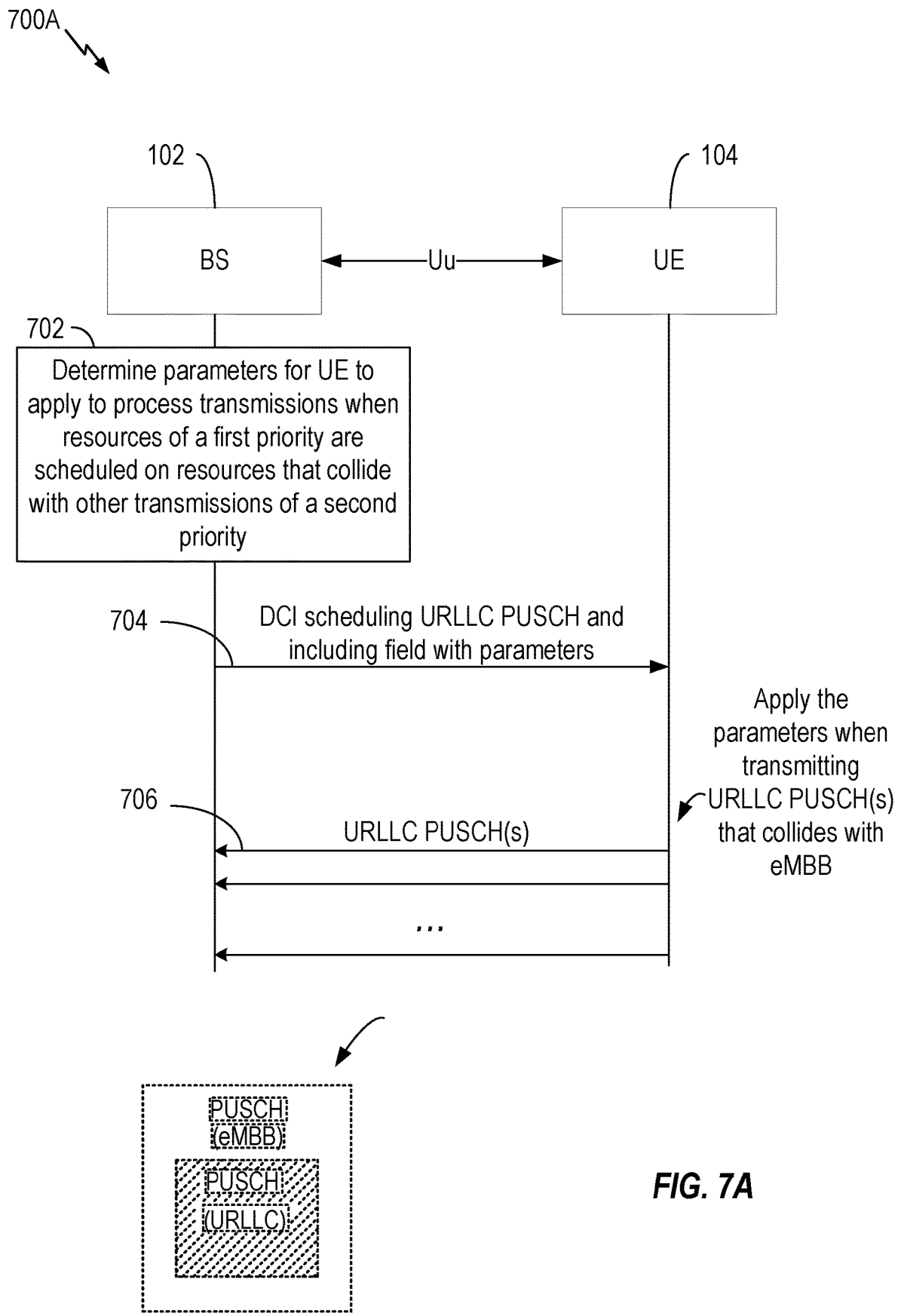
FIGS. 7A and 7B illustrate example call flow diagrams for performing operations and techniques described herein.
Figure 7B:
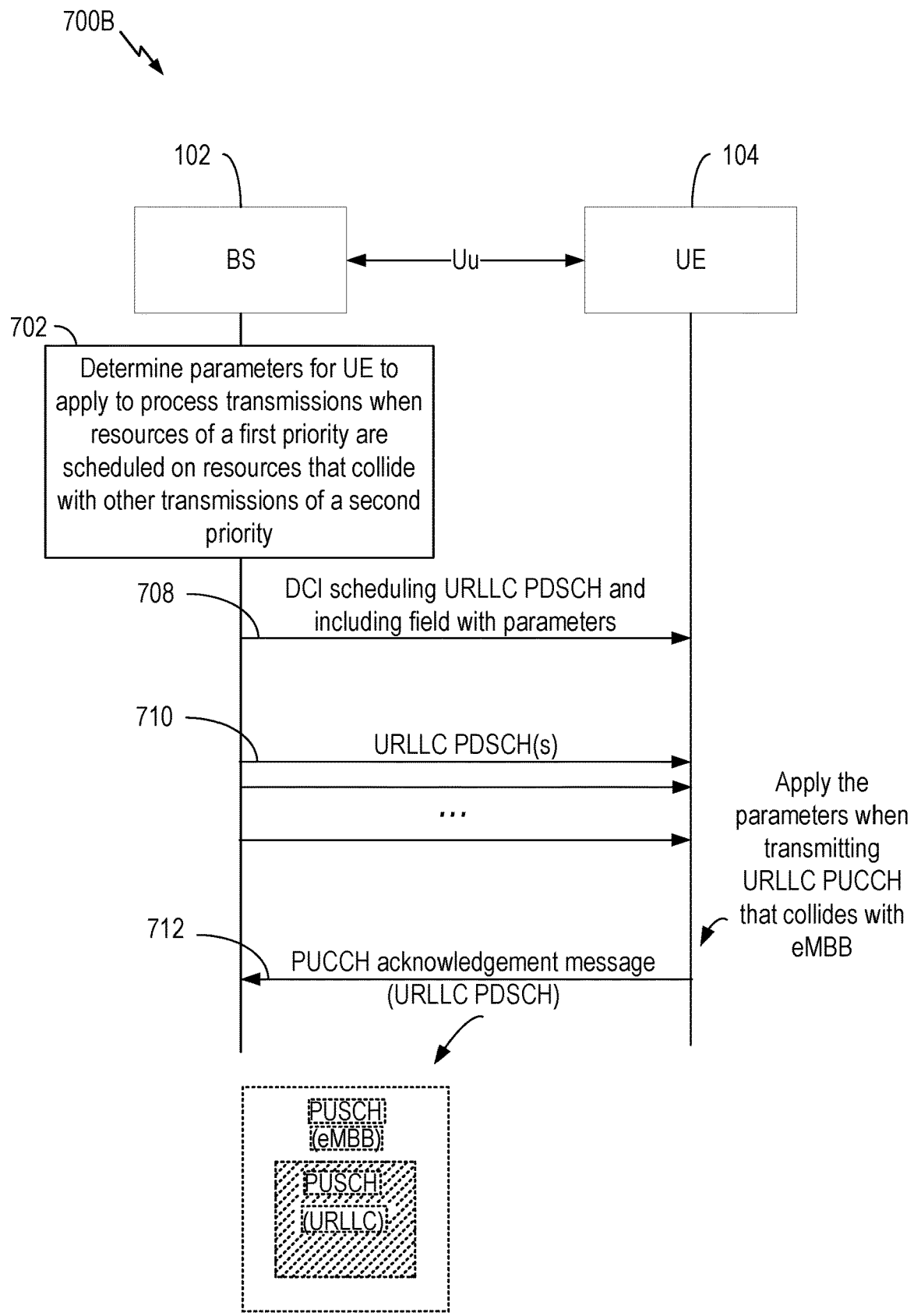

Operations 500 and 600 of FIGS. 5 and 6 may be understood with reference to the call flow diagrams of FIGS. 7A and 7B. FIG. 7A illustrates how a UE may apply PI and/or OLPC parameters to multiple uplink URLLC PUSCH transmissions scheduled with a single DCI. FIG. 7B illustrates how a UE may apply PI and/or OLPC parameters to PUCCH transmissions acknowledging URLLC PDSCH transmissions.

As illustrated in FIG. 7A, at 702, a BS 102 (e.g., gNB) may determine parameters for a UE to apply when processing multiple transmissions scheduled by a single DCI. As indicated at 704, the plurality of the transmissions may include URLLC PUSCH transmissions scheduled with a single DCI (indicating PI and/or OLPC parameters). In this case, the UE applies the parameters indicated in the DCI when transmitting one or more of the URLLC PUSCH transmissions, at 708. For example, the DCI may indicate PI and/or OLPC parameters for the UE to apply when resources of one or more of the URLLC PUSCH transmissions collide with one or more (previously scheduled) eMBB transmissions.

In the example illustrated in FIG. 7B, at 708 the BS 102 schedules multiple URLLC PDSCH transmissions scheduled with a single DCI (indicating PI and/or OLPC parameters). The URLLC PDSCHs are transmitted, at 710. In this case, the UE applies the parameters indicated in the DCI when transmitting one or more PUCCH transmissions, at 712, providing acknowledging feedback for the URLLC PDSCH transmission. As indicated, the PUCCH transmission may overlap with a previously scheduled eMBB PUSCH transmission.

In some cases, the multi-grant DCI may include a PI field. In this case, the one or more parameters may indicate for the UE to apply the PI field to all of the one or more of the plurality of transmissions scheduled by the DCI. In some cases, the UE may apply the priority indicated in the PI field to: a first of the plurality of transmissions scheduled by the DCI, a last of the plurality of transmissions scheduled by the DCI, or an integer M of the plurality of transmissions scheduled by the DCI.

In some cases, the PI field may include a bitmap indicating one or more of the plurality of transmissions scheduled by the DCI to which the PI field applies. In this case, each bit of the bitmap may indicate a priority of at least one transport block (TB) scheduled by the DCI (e.g., each TB corresponding to a PUSCH). In some cases, the number of TBs scheduled by the DCI may exceed the number of bits in the bitmap. In such cases, each bit of the bitmap may indicate a priority of a different group of one or more TBs scheduled by the DCI.

In some cases, the plurality of transmissions scheduled by the DCI may include PDSCH transmissions, the UE may be configured to support a single PUCCH per PDSCH scheduled by the DCI.

As noted above, in case the DCI schedules multiple PUSCH transmissions of the first priority (e.g., URLLC), the at least one field may include an OLPC field. In some cases, the UE may apply one or more parameters indicated the OLPC field to all of the PUSCH transmissions scheduled by the DCI. In other cases, the UE may apply one or more parameters indicated by the OLPC field to: a first of the PUSCH transmissions scheduled by the DCI, a last of the PUSCH transmissions scheduled by the DCI, or an integer M of the PUSCH transmissions scheduled by the DCI.

Additionally or alternatively, the OLPC field may include a bitmap indicating one or more of the PUSCH transmissions to which one or more parameters indicated by the OLPC field apply. In such cases, a size of the OLPC field for certain DCI formats may be increased to accommodate the bitmap.

In some cases, the plurality of the transmissions may include PDSCH transmissions of the first priority, such as URLLC PDSCH. In such cases, the UE may apply the one or more parameters to process one or more physical uplink control channel (PUCCH) transmissions for acknowledging one or more of the PDSCH transmissions, when resources of one or more of the PUCCH transmissions collide with resources of the at least one previously scheduled transmission of the second priority (e.g., eMBB).

In some cases, the at least one field may include a PI field. In this case, the UE may apply the PI field to all of the one or more of the plurality of transmissions scheduled by the DCI. Additionally or alternatively, the UE may apply a priority indicated in the PI field to: a first of the plurality of transmissions scheduled by the DCI, a last of the plurality of transmissions scheduled by the DCI, or an integer M of the plurality of transmissions scheduled by the DCI. In some cases, the PI field may include a bitmap indicating one or more of the plurality of transmissions scheduled by the DCI to which the PI field applies. In this case, each bit of the bitmap may indicate a priority of at least one TB scheduled by the DCI. Further, the number of TBs scheduled by the DCI may exceed the number of bits in the bitmap, and each bit of the bitmap may indicate a priority of a different group of one or more TBs scheduled by the DCI.

In some cases, the plurality of transmissions scheduled by the DCI include PDSCH transmissions, the UE may be configured to support a single PUCCH per PDSCH scheduled by the DCI.

In some cases, plurality of transmissions scheduled by the DCI include PUSCH transmissions of the first priority, and the at least one field may include an OLPC field. In this case, the UE may apply one or more parameters indicated the OLPC field to all of the PUSCH transmissions scheduled by the DCI. Furthermore, in some cases, the UE may apply one or more parameters indicated by the OLPC field to: a first of the PUSCH transmissions scheduled by the DCI, a last of the PUSCH transmissions scheduled by the DCI, or an integer M of the PUSCH transmissions scheduled by the DCI. Additionally or alternatively, the OLPC field may include a bitmap indicating one or more of the PUSCH transmissions to which one or more parameters indicated by the OLPC field apply.

In some cases, a single DCI scheduling multiple PDSCH transmissions with different PIs might imply that multiple PUCCHs per the grant would be sent. While PI indication could be supported for this scenario, in some cases. In other cases, similar to limitations placed on code block group (CBG) transmissions, PI indication may be not supported for multi-PDSCH/PUSCH grants. In this case, there may be no PI field (e.g., the PI field may have 0 bits) if a higher layer parameter (e.g., priorityIndicatorDCI-0-2) is not configured or if the number of scheduled PUSCHs indicated by the time domain resource assignment field is larger than some amount (e.g., 1).

In certain aspects, similar techniques as those described above with regard to the PI can be defined for interpretation of the OLPC field. For example, in some cases, the OLPC field size for multi-PUSCH grants may be maintained. In such cases, the (parameters indicated by the) OLPC field may be applied to all granted PUSCHs. In some cases, the OLPC field may be applied for the first or last PUSCH. Furthermore, the network entity may schedule the PDSCH/PUSCH with a higher priority to be the first or last granted allocation. This technique can be further generalized by applying it to the first or last M PUSCHs, where the values of M can be RRC configured.

In certain aspects, the size of OLPC field may be changed (e.g., increased). Accordingly, a bit map can be defined based on the number of scheduled PUSCHs and the field size. In some examples, similar to CBG transmission, PI and/or OLPC may not be supported for multi-PUSCH grants (e.g., where the PI may have 0 bits if the number of scheduled PUSCH indicated by the time domain resource assignment field is larger than 1).

In some cases, how the OLPC field is interpreted may be tied to how the PI field is interpreted. In other words, if the UE interprets the PI field according to one of the techniques described above, the UE may interpret the OLPC field using the same technique. For example, if the UE applies the PI field to all transmissions, it may also apply the OLPC field to all transmissions. In other cases, a single bitmap could indicate the same transmissions to which the UE is to apply the OLPC and PI fields.

Example Wireless Communication Devices

Figure 8:
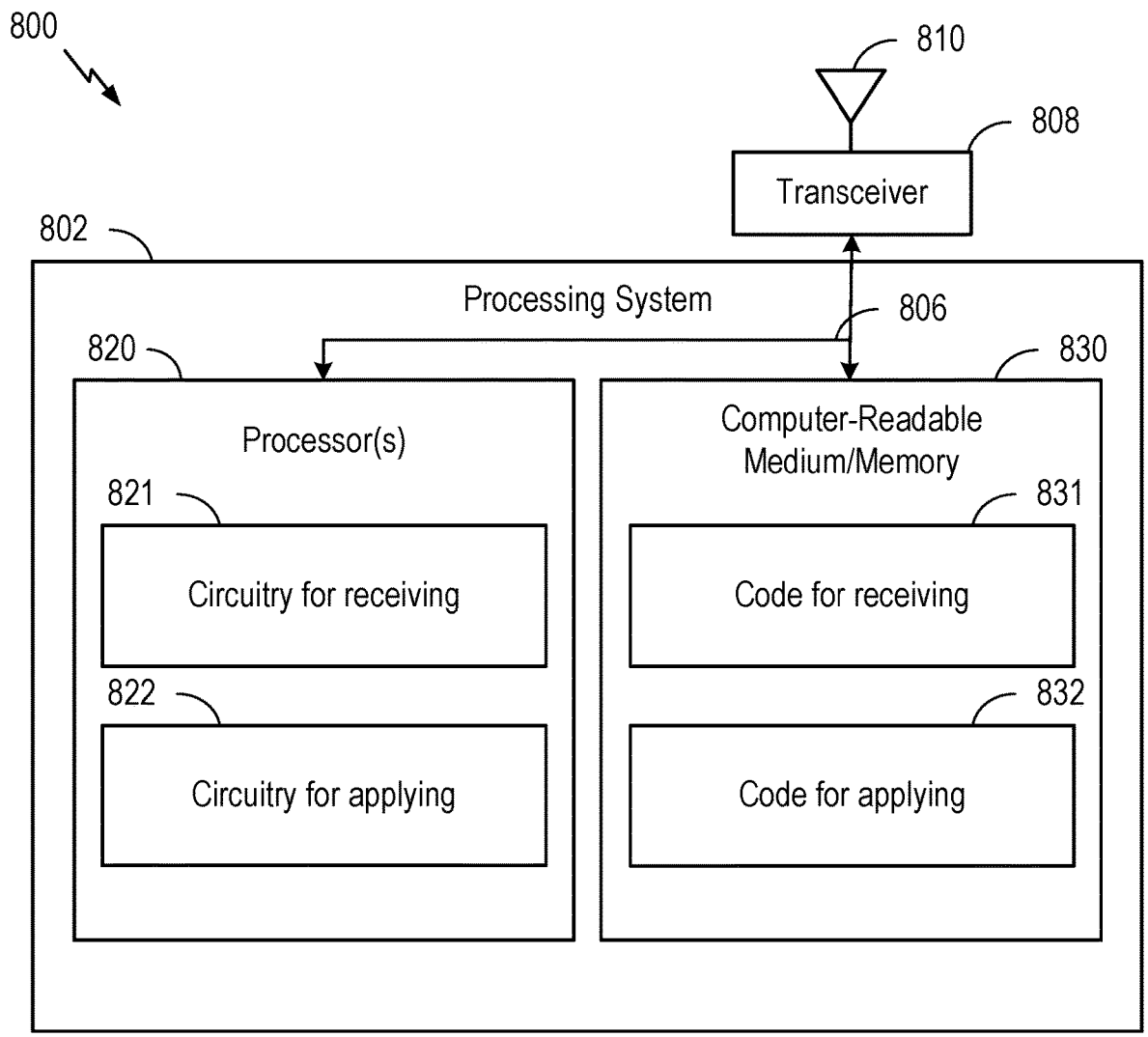
FIGS. 8 and 9 depict aspects of example communications devices.

FIG. 8 depicts an example communications device 800 that includes various components operable, configured, or adapted to perform operations for the techniques disclosed herein, such as the operations depicted and described with respect to FIG. 5. In some examples, communication device 800 may be a user equipment 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 5, or other operations for performing the various techniques discussed herein for communicating based on ultra-reliable low latency communications (URLLC) indications with multi-physical downlink shared channel (PDSCH) and/or multi-physical uplink shared channel (PUSCH) grants.

In the depicted example, computer-readable medium/memory 830 stores code 831 for receiving and code 832 for applying.

In the depicted example, the one or more processors 820 include circuitry configured to implement the code stored in the computer-readable medium/memory 830, including circuitry 821 for receiving and circuitry 822 for applying.

Various components of communications device 800 may provide means for performing the methods described herein, including with respect to FIG. 5.

In some examples, means for transmitting or sending (or means for outputting for transmission) may include the transceivers 254 and/or antenna(s) 252 of the user equipment 104 illustrated in FIG. 2 and/or transceiver 808 and antenna 810 of the communication device 800 in FIG. 8.

In some examples, means for receiving (or means for obtaining) may include the transceivers 254 and/or antenna(s) 252 of the user equipment 104 illustrated in FIG. 2 and/or transceiver 808 and antenna 810 of the communication device 800 in FIG. 8.

In some examples, means for applying may include various processing system components, such as: the one or more processors 820 in FIG. 8, or aspects of the user equipment 104 depicted in FIG. 2, including receive processor 258, transmit processor 264, TX MIMO processor 266, and/or controller/processor 280 (including TRS density component 281).

Notably, FIG. 8 is just use example, and many other examples and configurations of communication device 800 are possible.

Figure 9:
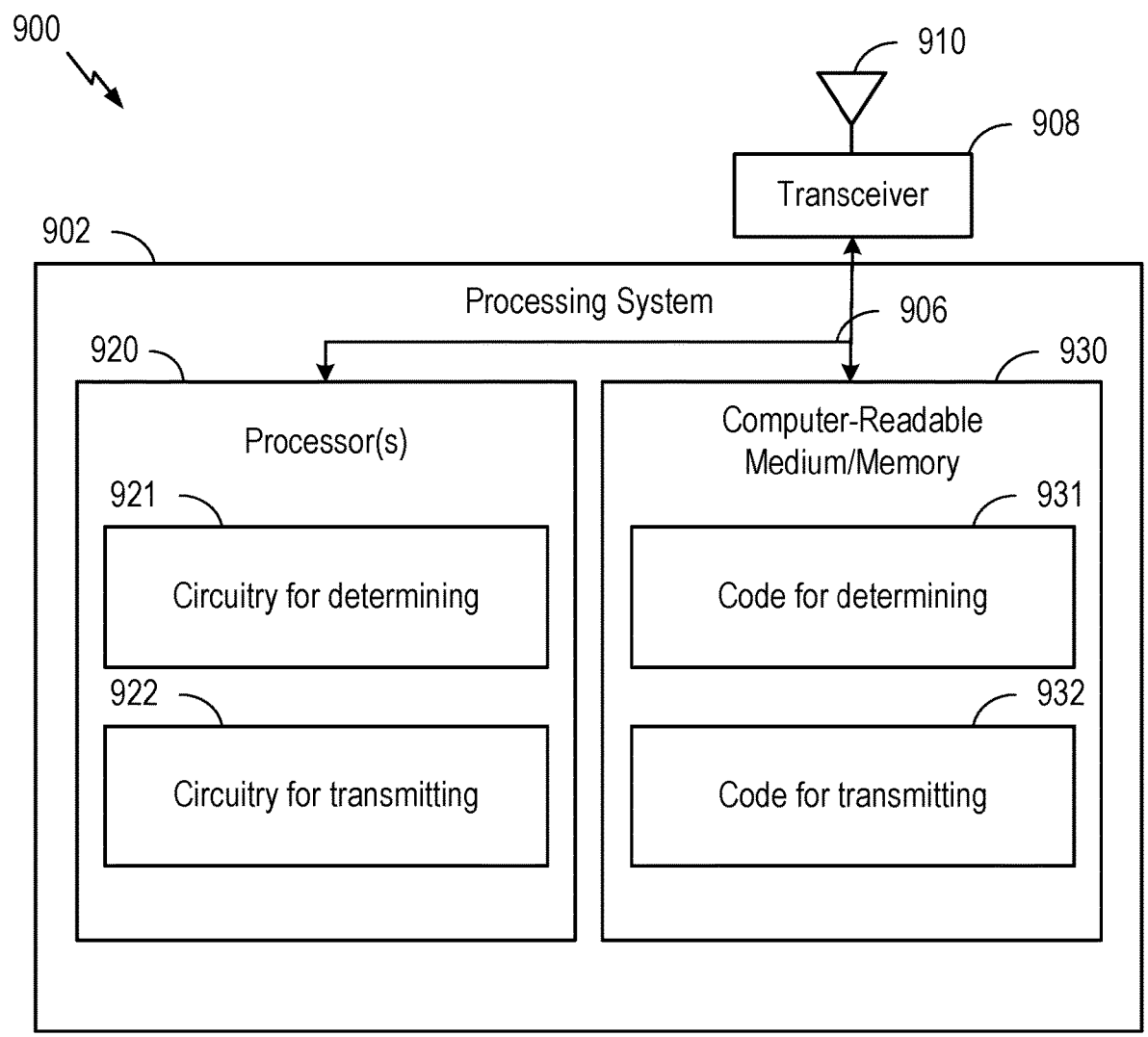

FIG. 9 depicts an example communications device 900 that includes various components operable, configured, or adapted to perform operations for the techniques disclosed herein, such as the operations depicted and described with respect to FIG. 5. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 6, or other operations for performing the various techniques discussed herein for communicating based on URLLC indications with multi-PDSCH and/or multi-PUSCH grants.

In the depicted example, computer-readable medium/memory 930 stores code 931 for determining and code 932 for transmitting.

In the depicted example, the one or more processors 920 include circuitry configured to implement the code stored in the computer-readable medium/memory 930, including circuitry 921 for determining and circuitry 922 for transmitting.

Various components of communications device 900 may provide means for performing the methods described herein, including with respect to FIG. 6.

In some examples, means for transmitting or sending (or means for outputting for transmission) may include the transceivers 232 and/or antenna(s) 234 of the base station 102 illustrated in FIG. 2 and/or transceiver 908 and antenna 910 of the communication device 900 in FIG. 9.

In some examples, means for receiving (or means for obtaining) may include the transceivers 232 and/or antenna(s) 234 of the base station illustrated in FIG. 2 and/or transceiver 908 and antenna 910 of the communication device 900 in FIG. 9.

In some examples, means for determining may include various processing system components, such as: the one or more processors 920 in FIG. 9, or aspects of the base station 102 depicted in FIG. 2, including receive processor 238, transmit processor 220, TX MIMO processor 230, and/or controller/processor 240 (including DCI component 241).

Notably, FIG. 9 is just use example, and many other examples and configurations of communication device 900 are possible.

EXAMPLE CLAUSES

Implementation examples are described in the following numbered clauses:

Clause 1: A method for wireless communications by a user equipment (UE), comprising receiving, from a network entity, downlink control information (DCI) scheduling a plurality of transmissions of a first priority, wherein the DCI comprises at least one field indicating one or more parameters to apply when at least one previously scheduled transmission of a second priority collides with: one or more of the plurality of transmissions of the first priority, or one or more transmissions acknowledging the one or more of the plurality of transmissions of the first priority; and applying the one or more parameters to process the plurality of the transmissions of the first priority.

Clause 2: The method of Clause 1, wherein the one or more of the plurality of transmissions of the first priority comprise ultra-reliable low latency communications (URLLC) transmissions; and the at least one transmission of the second priority comprise an enhanced mobile broadband (eMBB) transmission.

Clause 3: The method of Clause 1 or 2, wherein the plurality of transmissions comprise physical uplink shared channel (PUSCH) transmissions of the first priority; and applying the one or more parameters comprises applying the one or more parameters to process one or more of the PUSCH transmissions.

Clause 4: The method of any of Clauses 1-3, wherein the plurality of transmissions comprise physical downlink shared channel (PDSCH) transmissions; the one or more of the plurality of transmissions of the first priority comprises physical uplink control channel (PUCCH) transmissions for acknowledging one or more of the PDSCH transmissions; and applying the one or more parameters comprises applying the one or more parameters to process the PUCCH transmissions.

Clause 5: The method of any of Clauses 1-4, wherein the at least one field comprises a priority indicator (PI) field.

Clause 6: The method of Clause 5, wherein applying the one or more parameters comprises applying a priority indicated in the PI field to: all of the one or more of the plurality of transmissions scheduled by the DCI, a first of the plurality of transmissions scheduled by the DCI, a last of the plurality of transmissions scheduled by the DCI, or an integer M of the plurality of transmissions scheduled by the DCI.

Clause 7: The method of Clause 5 or 6, wherein the PI field comprises a bitmap indicating one or more of the plurality of transmissions scheduled by the DCI to which the PI field applies.

Clause 8: The method of Clause 7, wherein each bit of the bitmap indicates a priority of at least one transport block (TB) scheduled by the DCI.

Clause 9: The method of Clause 8, wherein a number of TBs scheduled by the DCI exceeds a number of bits in the bitmap; and each bit of the bitmap indicates a priority of a different group of one or more TBs scheduled by the DCI.

Clause 10: The method of any of Clauses 1-9, wherein the plurality of transmissions scheduled by the DCI comprise physical downlink shared channel (PDSCH) transmissions; and the UE is configured to support a single PUCCH per PDSCH scheduled by the DCI.

Clause 11: The method of any of Clauses 1-10, wherein the plurality of transmissions scheduled by the DCI comprise physical uplink shared channel (PUSCH) transmissions of the first priority; and the at least one field comprises an open loop power control (OLPC) field.

Clause 12: The method of Clause 11, wherein applying the one or more parameters comprises applying at least one parameter indicated by the OLPC field to: all of the PUSCH transmissions scheduled by the DCI, a first of the PUSCH transmissions scheduled by the DCI, a last of the PUSCH transmissions scheduled by the DCI, or an integer M of the PUSCH transmissions scheduled by the DCI.

Clause 13: The method of Clause 11 or 12, wherein the OLPC field comprises a bitmap indicating one or more of the PUSCH transmissions to which at least one parameter indicated by the OLPC field applies.

Clause 14. The method of Clause 11, wherein the plurality of transmissions scheduled by the DCI comprise physical downlink shared channel (PDSCH) transmissions; and the UE is configured to support a single PUCCH per PDSCH scheduled by the DCI.

Clause 15: A method for wireless communications by a network entity, comprising determining one or more parameters for a user equipment (UE) to apply to process a plurality of transmissions of a first priority when at least one previously scheduled transmission of a second priority collides with: one or more of the plurality of transmissions of the first priority, or one or more transmissions acknowledging the one or more of the plurality of transmissions of the first priority; and transmitting, to the UE, downlink control information (DCI) scheduling the plurality of transmissions, wherein the DCI comprises at least one field indicating the one or more parameters.

Clause 16: The method of Clause 15, wherein the one or more of the plurality of transmissions of a first priority comprise ultra-reliable low latency communications (URLLC) transmissions; and the at least one transmission of the second priority comprise an enhanced mobile broadband (eMBB) transmission.

Clause 17: The method of Clause 15 or 16, wherein the plurality of the transmissions comprise physical uplink shared channel (PUSCH) transmissions of the first priority; and the one or more parameters are to be applied to process one or more of the PUSCH transmissions.

Clause 18: The method of any of Clauses 15-16, wherein the plurality of transmissions comprise physical downlink shared channel (PDSCH) transmissions; the one or more of the plurality of transmissions of the first priority comprises physical uplink control channel (PUCCH) transmissions for acknowledging one or more of the PDSCH transmissions; and the one or more parameters are to be applied to process the PUCCH transmissions.

Clause 19: The method of any of Clauses 15-18, wherein the at least one field comprises a priority indicator (PI) field.

Clause 20: The method of Clause 19, wherein a priority indicated in the PI field is to be applied to: all of the one or more of the plurality of transmissions scheduled by the DCI, a first of the plurality of transmissions scheduled by the DCI, a last of the plurality of transmissions scheduled by the DCI, or an integer M of the plurality of transmissions scheduled by the DCI.

Clause 21: The method of Clause 19 or 20, wherein the PI field comprises a bitmap indicating one or more of the plurality of transmissions scheduled by the DCI to which the PI field applies.

Clause 22: The method of Clause 21, wherein each bit of the bitmap indicates a priority of at least one transport block (TB) scheduled by the DCI.

Clause 23: The method of Clause 22, wherein a number of TBs scheduled by the DCI exceeds a number of bits in the bitmap; and each bit of the bitmap indicates a priority of a different group of one or more TBs scheduled by the DCI.

Clause 24: An apparatus, comprising: a memory comprising executable instructions; and one or more processors configured to execute the executable instructions and cause the apparatus to perform a method in accordance with any one of Clauses 1-28.

Clause 25: An apparatus, comprising means for performing a method in accordance with any one of Clauses 1-23.

Clause 26: A non-transitory computer-readable medium comprising executable instructions that, when executed by one or more processors of an apparatus, cause the apparatus to perform a method in accordance with any one of Clauses 1-23.

Clause 27: A computer program product embodied on a computer-readable storage medium comprising code for performing a method in accordance with any one of Clauses 1-23.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mm-Wave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a packet-switched (PS) Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication system 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication system 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Additional Considerations

The preceding description provides examples of variable tracking reference signal (TRS) densities in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communications by a user equipment (UE), comprising:
  receiving downlink control information (DCI) scheduling a plurality of physical downlink shared channel (PDSCH) transmissions of a first priority, wherein the DCI comprises a priority indicator (PI) field indicating one or more parameters to apply when at least one previously scheduled transmission of a second priority collides with one or more physical uplink control channel (PUCCH) transmissions acknowledging one or more of the plurality of PDSCH transmissions of the first priority and wherein the PI field comprises a bitmap indicating one or more of the plurality of PDSCH transmissions scheduled by the DCI to which the PI field applies; and
  applying the one or more parameters indicated in the PI field to the one or more PUCCH transmissions acknowledging the one or more of the plurality of PDSCH transmissions of the first priority, wherein the first priority is higher than the second priority.

2. The method of claim 1, wherein:
  the one or more of the plurality of PDSCH transmissions of the first priority comprise ultra-reliable low latency communications (URLLC) transmissions; and
  the at least one previously scheduled transmission of the second priority comprise an enhanced mobile broadband (eMBB) transmission.

3. The method of claim 1, wherein each bit of the bitmap indicates a priority of at least one transport block (TB) scheduled by the DCI.

4. The method of claim 3, wherein:
  a number of TBs scheduled by the DCI exceeds a number of bits in the bitmap; and
  each bit of the bitmap indicates a priority of a different group of one or more TBs scheduled by the DCI.

5. The method of claim 1, wherein:
  the UE is configured to support a single PUCCH per PDSCH scheduled by the DCI.

6. An apparatus for wireless communication by a user equipment (UE), comprising:
  a memory comprising instructions; and
  one or more processors configured, individually or in any combination, to execute the instructions and cause the apparatus to:
    receive downlink control information (DCI) scheduling a plurality of physical downlink shared channel (PDSCH) transmissions of a first priority, wherein the DCI comprises a priority indicator (PI) field indicating one or more parameters to apply when at least one previously scheduled transmission of a second priority collides with or more physical uplink control channel (PUCCH) transmissions acknowledging the one or more of the plurality of PDSCH transmissions of the first priority and wherein the PI field comprises a bitmap indicating one or more of the plurality of PDSCH transmissions scheduled by the DCI to which the PI field applies; and
    apply a priority indicated in the PI field to the one or more PUCCH transmissions acknowledging the one or more of the plurality of PDSCH transmissions of the first priority, wherein the first priority is higher than the second priority.

7. The apparatus of claim 6, wherein:
  the one or more of the plurality of PDSCH transmissions of the first priority comprise ultra-reliable low latency communications (URLLC) transmissions; and
  the at least one transmission of the second priority comprise an enhanced mobile broadband (eMBB) transmission.

* * * * *